United States Patent [19]

Grindstaff

[11] 4,036,999

[45] July 19, 1977

[54] TREATMENT OF WHEY

[75] Inventor: Donald A. Grindstaff, Minnetonka, Minn.

[73] Assignee: Stauffer Chemical Company, Westport, Conn.

[21] Appl. No.: 631,799

[22] Filed: Nov. 13, 1975

Related U.S. Application Data

[63] Continuation of Ser. No. 502,262, Aug. 30, 1974, abandoned, which is a continuation of Ser. No. 336,843, Feb. 28, 1973, abandoned.

[51] Int. Cl.$^2$ .................... A23C 21/00; A21D 2/34
[52] U.S. Cl. .................... 426/549; 426/41; 426/556; 426/583; 426/657
[58] Field of Search .................... 426/41, 583, 549, 417, 426/657, 556

[56] References Cited

U.S. PATENT DOCUMENTS 3,061,442  10/1962  Ward et al. .................... 426/583
3,560,219  2/1971  Attebery .................... 426/417

FOREIGN PATENT DOCUMENTS 5,140  1/1922  Australia

OTHER PUBLICATIONS

Webb, et al., By products from Milk, The Avi Pub. Co. Inc., Westport, Conn. 1970 (pp. 16–20, 213, 214, 349 & 350).

*Primary Examiner*—David M. Naff
*Attorney, Agent, or Firm*—Paul J. Juettner

[57] ABSTRACT

Clogging of membranes during whey processing is avoided by pretreating raw acid cheese whey by adjusting the pH to above about 6.5 and separating insoluble solids therefrom. The separated insoluble solids are treated by adding calcium ion, holding at a temperature above about 125° F for at least 1 hour and drying. The resultant dry treated insoluble solids are useful as a substitute for nonfat dried milk in bakery products.

16 Claims, No Drawings

TREATMENT OF WHEY

This is a continuation of application Ser. No. 502,262 filed Aug. 30, 1974, which in turn is a continuation of application Ser. No. 336,843, filed Feb. 28, 1973, and both now abandoned.

BACKGROUND OF THE INVENTION

This invention relates to the formation, separation, and modification of solids derived from raw cheese whey, and particularly from raw acid cheese whey.

In addition, this invention relates to the modified dried whey obtained by the process of this invention and its use in food products and particularly bakery products.

Cheese whey is generally defined as the liquid byproduct from the manufacturer of cheese and casein. Basically, cheese whey is the byproduct obtained by the acid, or rennet coagulation of milk protein (i.e., casein) from milk. The whey obtained from the acid coagulation is called acid whey and that obtained from rennet, sweet whey.

The acid coagulation of milk protein from milk involves either the addition of lactic acid producing bacteria (e.g., Lactobacillus sp.) or the addition of mineral acid (i.e., direct acidification). Regardless of the method used to acidify milk, acidification is allowed to proceed until a pH of about 4.6 is reached. At this pH, casein becomes insolubilized and coagulates as cheese. The cheese produced by using lactic acid is commonly known as cottage cheese. The whey obtained by the separation and removal of this cheese curd is called cottage cheese whey. The whey obtained by direct acidification of milk with mineral acid is commonly known as casein whey.

Sweet cheese whey is obtained by the separation and removal of coagulated casein produced by the addition of a proteolytic enzyme to milk. The proteolytic enzymes generally used are known as rennin and/or pepsin. The addition of one or both of these enzymes to milk soon thereafter causes the coagulation of casein. The cheese curd thus produced is the product of the enzymatic coagulation of casein. Specific examples of cheese products produced by this general method are cheddar cheese, swiss cheese and mozzarella cheese.

It is known that acid cheese whey contains whey proteins, milk sugar (lactose), and salts in substantially the same form as that contained in the original milk. In contrast, sweet cheese whey, since it is obtained from the enzymatic coagulation of milk protein, contains whey proteins, milk sugar (lactose), salts, and an unknown component. The unknown component is presumably related to the proteolytic enzyme used in this method of cheese production. Processing of acid and sweet cheese whey, therefore, must take into consideration the chemical differences in these two types of cheese whey.

Various membrane processing techniques are currently used to separate cheese-whey solids, for example, gel filtration, ultra filtration, reverse osmosis, and electrodialysis may be used. Since the above mentioned processes separate whey solids on a molecular weight basis by using semi-permeable membranes, any molecular constituent in the raw whey which tends to clog the semi-permeable membrane, creates inefficiency of operation. It is, therefore, desirable to remove by pretreatment the constituent responsible for clogging the semi-permeable membrane.

Several pretreatment methods are currently used in an attempt to resolve this problem. One of these can be described as additional centrifugal clarification of raw cheese whey. This method removes insoluble material originally contained in raw cheese whey. However, this method does not remove solubilized constituents that tend to clog the membrane.

Another known method used to remove soluble constituents from cheese whey by pretreatment purposes is disclosed is U.S. Pat. No. 3,560,219. This process discloses the addition of divalent metal ion to calcium deficient raw cheese whey, the neutralization of pH by the addition of caustic, and the removal of the precipitate thus formed. Although, the process disclosed in this patent removes solubilized lipid from raw whey, the addition of divalent ion to raw whey requires an additional step in the separation and recovery of whey solids. Furthermore, divalent metal ion addition to raw whey may upset the ionic equilibrium among the major constituents obtained by membrane processing. The finally separated whey protein may exhibit off flavor due to the divalent metal ion addition to the raw whey. However, this problem is solved by the present invention.

With reference to the use of whey products in human food systems, it has been desirable to attempt to replace nonfat dry milk solids in various bakery products. However, it is known that whey solids generally do not function as nonfat milk solid substituents in human food systems.

SUMMARY OF THE INVENTION

In accordance with the present invention, it has now been found that clogging of membranes used in membrane processing of whey can be substantially eliminated by pretreating a specific whey feed. Particularly, this pretreatment comprises adjusting the pH of a raw cheese whey feed containing at least 20% acid cheese whey to between about 6.5 to about 8.0 by the addition of base whereby insoluble solids are formed within the raw cheese whey feed. The insoluble solids are separated from the remaining liquor of the feed to provide a non-clogging feed for further membrane processing.

In addition, it has also been found that the insoluble solids formed by base addition to the raw cheese whey feed can be recovered and used as a food additive, per se, or further modified by adding calcium ion at a concentration between about .002 to about .010 grams per gram of insoluble solids (dry basis) and heating the mixture to between about 125° F. to about 200° F. for at least about 1/6 hour.

During the pH adjustment, insoluble solids form in the raw whey and the removal of this raw whey constituent assists in the processing of the remaining cheese whey liquor by conventional membrane processing techniques. In addition, the insoluble solids per se or the calcium ion/heat treated solids obtained by the above process may be used as a total or partial substitute for nonfat dry milk solids in bakery and other food products.

DETAILED DESCRIPTION OF THE INVENTION

By raw cheese whey feed as disclosed above, it is meant herein raw cheese whey containing at least 20% acid cheese whey, for example, cottage cheese whey and casein whey. The remainder of the raw cheese whey feed disclosed above may be constituted by raw sweet whey blended with the raw acid whey. By raw sweet whey, it is meant herein the liquid obtained when milk protein is coagulated by the action of proteolytic enzymes, as for example, rennin, or pepsin, and subsequent curd removal. Generally, blends of acid cheese whey and sweet cheese whey must contain at least 20% acid cheese whey. Specifically, an acid cheese whey-sweet cheese whey blend consisting of from about 40% to about 80% cottage cheese whey and respectively from about 60% to about 20% cheddar cheese whey is preferred. The most preferred feed is substantially 100% acid cheese whey.

The pH neutralization of raw cheese whey is effected by the addition of a base to the raw whey. Sufficient base is added to give a pH in the range of about 6.5 to 8.0. The bases normally used for this purpose are food grade since the final products are generally destined for human consumption and are illustrated by sodium hydroxide, potassium hydroxide, or calcium hydroxide, though sodium hydroxide is preferred.

In the pH range specified above, insoluble whey solids form in the cheese whey. Separation and removal of insoluble whey solids from the liquid cheese whey is effected by gravity sedimentation. By gravity sedimentation it is meant herein gravity settling, centrifugal clarification, or any other accelerated gravity sedimentation method. The preferred method of separation is by centrifugal clarification. In the preferred method of separation, the degree of removal of insoluble whey solids is dependent upon the centrifugal force developed by the particular clarifier and the flow rate through the clarifier. Adjustment of the parameters related to centrifugal clarification should be made so that essentially all of the insoluble whey solids are removed at this step.

The non-clogging feed from the clarifier may be further processed by conventional membrane processing to separate the protein fraction from the lactose and mineral fraction. For example, the non-clogging feed may be further processed by passing the feed through a bed containing molecular sieve resin in accordance with U.S. Pat. No. 3,547,900. In addition, the non-clogging feed may also be processed by other conventional membrane techniques such as ultrafiltration, reverse osmosis, and electrodialysis to achieve similar results. The protein fraction obtained from the product of the process can be used as a nutritional additive for food.

The separated insoluble solids are generally obtained as described above in the form of an aqueous mixture containing about 10% total solids. The solids content can vary according to the degree of water removal effected during the recovery of insoluble solids. This mixture can therefore be characterized as a sludge and consists of an aqueous mixture of insoluble solids.

The sludge may be used as is or dried without further processing to give an effective product. The sludge can also be further processed by adding calcium ion thereto at a concentration of between about 0.002 grams to about 0.010 grams calcium ion per gram of insoluble solids on a dry basis contained in said sludge. The temperature of this addition may be carried out at any temperature though it is preferred to conduct the addition at a temperature of between about 105 to about 155° F. For food purposes, the calcium ion addition is effected by using a food grade calcium salt, as for example, calcium dihydrogen phosphate, calcium chloride, or calcium acetate, though calcium dihydrogen phosphate is preferred.

The calcium treated sludge is then heated at elevated temperature of between about 125° F. to about 200° F. for at least about 1/6 hours and preferably from about 1 to about 4 hours.

It is understood by one skilled in the art that heating at high temperature for excessive time is to be avoided due to heat induced browning.

The preferred heating temperature and time is between about 150° F. to about 155° F. for 1 to 4 hours. This additional heating step causes heat conditioning of the insoluble whey solids in the sludge to thereby increase its functionality in human foodstuffs. It is essential that the sludge be treated and that calcium ion be added though not necessarily in that order. The extent of heating must be sufficient to heat condition the sludge. This requires at least about 1/6 hour though longer times are preferred to insure complete conditioning. The sludge may be held at a temperature for any period of time beyond that necessary for conditioning without adverse effects though times longer than 48 hours are not preferred. It is to be understood that any such holding should not be extensive at elevated temperatures, around 200° F., nor should the product be held at low temperatures (below 125° F.) prior to drying as the sludge is an effective growth medium for bacteria. It is preferred that the product be dried as soon as possible after heat conditioning. Also, the heating can be accomplished in combination with other processing steps. Thus, this heating step may be effected during product pasteurization.

Lastly, the sludge either with or without the described calcium ion treatment, can be dried by any conventional methods, as for example, spray drying.

The modified dried whey prepared from the sludge of the process of the present invention including the calcium ion treated sludge can be used as a food additive in baked goods, icings, custard fillings and puddings, gravies and sauces, and as a water binding agent in bakery products. The modified dried whey obtained from the sludge of the process of the present invention including the calcium ion treated sludge can also be used as a total or partial replacement for nonfat dry milk in food products and particularly bakery products. Replacement may be accomplished on a 1 to 1 weight ratio basis in any standard recipe.

By bakery products it is meant herein, cakes, pancakes, icings, cookies, batters and breadings. More particularly, by bakery products it is meant herein white and yellow cakes, sweet doughs, and custard fillings.

The invention is further illustrated in the Examples which follow.

EXAMPLE 1

Acid cheese whey may be pretreated as follows:

To 245.5 g. of raw cottage cheese whey was added a solution containing 50% sodium hydroxide to raise the pH to about 7.2. The insoluble solids thus formed were separated from the cheese whey supernatant by centrifugal clarification. The sludge containing the insoluble solids weighed 16.2 g. and contained 13.3% solids. The sludge containing the insoluble solids was then dried by spray drying. A typical analysis of the sludge obtained by this process is as follows:

Lactose, %; 30.8
Ash, %; 34.3
Protein (Nx6.38), %; 20.4

EXAMPLE 2

A blend of acid cheese whey and sweet cheese whey is pretreated by the process of the present invention as follows:

To 240.8 g. of a blend containing 50% cottage cheese whey and 50% cheddar cheese whey was added a solution containing 50% sodium hydroxide to raise the pH to about 7.2. The insoluble solids thus formed were separated from the cheese whey supernatant by centrifugal clarification. The sludge containing the insoluble solids weighed 13.3 g. and contained about 13.2% solids. A typical analysis of the sludge obtained by this process is as follows:

Lactose, %; 36.6
Ash, %; 34.0
Protein (Nx6.36), %; 24.9

EXAMPLE 3

The procedure outlined in Example 2 was repeated on a plant scale using a blend of 70% cottage cheese whey and 30% cheddar cheese whey. Calcium ion was added to the separated insoluble sludge obtained at a level of about 0.003 grams per gram of insoluble solids (dry basis) and heat treated at 150° F. to 155° F. in a holding tank for up to four hours. The product was then dried by spray drying and had the following analysis:

Lactose, %; 38.6
Ash, %; 34.5
Protein (Nx6.38),%; 18.4

EXAMPLE 4

A yellow cake was prepared according to the following formulation.

| Ingredients | % (Solids basis) | Grams |
|---|---|---|
| Cake flour | 34.80 | 696 |
| Milled sugar | 46.50 | 930 |
| NFDM* | 2.00 | 40 |
| Salt | 1.20 | 24 |
| Soda, granular | 0.78 | 15.6 |
| Gelatinized starch | 3.40 | 68 |
| BL-60** | 0.92 | 18.4 |
| (Stauffer Chemical Company) | | |
| Guar gum | 0.20 | 4.0 |
| Shortening | 10.20 | 204 |

*Nonfat dry milk
**Sodium aluminum phosphate

The method of preparation is as follows: All the dry ingredients were sifted and then mixed in a blender for five minutes. The mixture was then transferred to a Hobart mixer and shortening added and blended for 4 minutes. The mixture was then put through a cake finisher 2 times. To 570 grams of the cake mixture obtained as described above, 1 1/4 cups of water and 2 whole eggs were added and then mixed for 4 minutes at medium speed on a mixer. The cake mixture was then placed in cake pans and baked at 350° F. for 30 minutes.

EXAMPLE 5

The cake was prepared in accordance with Example 4 except that nonfat dry milk was replaced on a weight to weight basis by modified dried whey of Example 3. The results of the cake evaluation are presented in Table 1.

TABLE 1
Evaluation of Modified Dried Whey In Yellow Cake

| Example | Batter Sp. Vol. | Average Sp. Vol. |
|---|---|---|
| 4 (NFDM)* | 0.88 | 3.12 |
| 5 (Modified Dried Whey) | 0.87 | 3.06 |

*Nonfat Dry Milk

EXAMPLE 6

A custard filling was prepared according to the following formulation:

| Mixture (A) | |
|---|---|
| Ingredients | Grams |
| Sugar, Baker's Special | 906 |
| Salt | 14.6 |
| NFDM | 453 |
| Water (cool) | 27.10 |

The above ingredients were mixed and dissolved. Once dissolved, the mixture was then heated while stirring to boiling temperature.

| Mixture (B) | |
|---|---|
| Ingredients | Grams |
| Water (cool) | 906 |
| Corn starch | 342 |
| Egg Solids (fresh) | 905 |

The starch in the above mixture (B) was dissolved in water. The eggs were then whipped slightly and added to the starch mixture. Mixture (B) was then added to boiling mixture (A) while stirring until custard boils and thickens.

| Mixture (C) | |
|---|---|
| Ingredients | Grams |
| Margarine | 142.5 |
| Vanilla | 57 |

After the heat is removed from the boiled custard, described above, the mixture (C) is added thereto with stirring.

EXAMPLE 7

A custard filling was prepared in accordance with Example 6, except that modified dried whey of Example 3 was used to replace nonfat dry milk on a weight to weight basis. The results of this evaluation of Examples 5 and 6 are presented in Table 2.

TABLE 2
Evaluation of Modified Dried Whey in Custard Filling

| Example | Firmness* | Flavor |
|---|---|---|
| 6 (NFDM) | 31.60 | Normal |
| 7 (Modified Dried Whey) | 30.16 | Slightly Starchy |

*Viscosity determined with Brookfield viscometer (Spindle D, Speed 10). The higher the value, the firmer the product.

As used herein and unless otherwise indicated, all percentages are by weight based on the total weight of the referenced base material, i.e., blend, feed, and the like.

What is claimed is:

1. A process for pretreating a raw cheese whey feed containing at least 20% acid cheese whey said percent being by weight based on the total weight of said feed and recovering insoluble solids therefrom which process consists essentially of:
a. adjusting the pH of said raw cheese whey feed to between about 6.5 to about 8.0 by the addition of base, whereby insoluble solids are formed within said raw cheese whey feed;
b. separating said insoluble solids produced by (a) above from said feed and recovering said insoluble solids as sludge; said liquid remaining after said insoluble solids removal also being recovered as a mother liquor; and
c. adding to said insoluble solids obtained by (b) after separation from said feed calcium ion at a concentration between about 0.002 to about 0.010 grams per gram of insoluble solids (dry basis) and heating the mixture to between about 125° F. to 200° F. for at least 1/6 hour.

2. The process of claim 1 wherein said raw cheese whey consists of from about 40% to about 100% acid cheese whey and, correspondingly, from about 60% to about 0% sweet cheese whey feed, said percent being by weight based on the total weight of said blend.

3. The process of claim 2 wherein said raw cheese whey feed is about 100% acid cheese whey.

4. The process of claim 1 wherein said raw cheese whey is cottage cheese whey.

5. The process of claim 1 wherein said base is sodium hydroxide.

6. The process of claim 1 wherein said insoluble solids are recovered by gravity sedimentation.

7. The process of claim 6 wherein said gravity sedimentation is centrifugal clarification.

8. The process of claim 1 wherein said raw cheese whey feed is at a temperature of at least about 125° F.

9. The process of claim 1 wherein said calcium ion is derived from calcium salts selected from the group consisting of calcium dihydrogen phosphate, calcium chloride, and calcium acetate.

10. The process of claim 1 wherein said mixture is heated to between about 150° F. to about 155° F. for 1 to 4 hours.

11. The process of claim 1 which further includes drying said heated mixture by conventional methods.

12. A method of producing an improved baking composition for preparing a baked good which comprises admixing the ingredients of said baked good with a water bindingly effective amount of the product prepared by the process of claim 1 to form said baking composition.

13. The method of claim 12 wherein said baked good is a white cake.

14. The method of claim 12 wherein said baked good is sweet dough.

15. The method of claim 12 wherein said baked good is a custard filling.

16. The baking composition prepared by the method of claim 12.

* * * * *